United States Patent
Shaked et al.

(10) Patent No.: US 7,356,195 B2
(45) Date of Patent: Apr. 8, 2008

(54) SYSTEM AND METHOD FOR ESTIMATING IMAGE SHARPNESS

(75) Inventors: Doron Shaked, Haifa (IL); Ingeborg Tastl, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 720 days.

(21) Appl. No.: 10/835,910

(22) Filed: Apr. 29, 2004

(65) Prior Publication Data
US 2005/0244074 A1  Nov. 3, 2005

(51) Int. Cl.
*G06K 9/40* (2006.01)
*H04N 1/46* (2006.01)

(52) U.S. Cl. ............... 382/260; 382/266; 382/274; 358/532

(58) Field of Classification Search ........... 382/260, 382/286
See application file for complete search history.

(56) References Cited

U.S. PATENT DOCUMENTS

| | | | |
|---|---|---|---|
| 5,363,209 A | 11/1994 | Eschbach et al. | |
| 5,867,606 A | 2/1999 | Tretter | |
| 6,118,906 A | 9/2000 | Keyes et al. | |
| 6,233,357 B1* | 5/2001 | Li et al. | 382/248 |
| 6,285,801 B1 | 9/2001 | Mancuso et al. | |
| 6,665,448 B1* | 12/2003 | Maurer | 382/261 |
| 6,678,424 B1* | 1/2004 | Ferguson | 382/286 |
| 6,847,738 B1* | 1/2005 | Scognamiglio et al. | 382/260 |
| 7,092,582 B2* | 8/2006 | Hier et al. | 382/279 |
| 2002/0097911 A1 | 7/2002 | de Queiroz | |
| 2002/0131647 A1 | 9/2002 | Matthews | |
| 2003/0035581 A1 | 2/2003 | Islam | |
| 2004/0120602 A1* | 6/2004 | Nakajima et al. | 382/275 |
| 2006/0039622 A1* | 2/2006 | Casale et al. | 382/266 |

FOREIGN PATENT DOCUMENTS

| | | |
|---|---|---|
| EP | 1168824 | 1/2002 |
| EP | 1205878 | 5/2002 |

OTHER PUBLICATIONS

Deriche R., "Fast Algorithms for Low-Level Vision", IEEE 9th Conference on Pattern Recognition, vol. 1, Nov. 14-17, 1988, pp. 434-438.*

Jung, et al.; "Univariant Assessment of the Quality of Images"; pp. 354-364; Journal of Electronic Imaging; Jul. 2002.

(Continued)

*Primary Examiner*—Jingge Wu
*Assistant Examiner*—José M Torres

(57) ABSTRACT

A method for determining image sharpness estimation of an image. Image data for at least one column of pixels and at least one row of pixels of the image is sampled. A first filter is applied on sequential differences of sampled image data resulting in a first filtered sequence of first filtered values. A second filter is applied on the sequential differences resulting in a second filtered sequence of second filtered values. A feature set of pixels of the image is selected. Image sharpness estimation is determined based on the first filtered values and the second filtered values of the feature set of pixels.

22 Claims, 3 Drawing Sheets

OTHER PUBLICATIONS

Kundar, et al.; "Blind Image Deconvolution"; pp. 43-64; IEEE Signal Processing Magazine; May 1996.

Acton, et al.; "Nonlinear Image Estimation Using Piecewise and Local Image Models"; pp. 979-991; IEEE Transactions on Image Processing; Jul. 1998.

Kayargadde, et al.; "An Objective Measure for Perceived Noise"; pp. 187-206; Signal Processing 49; 1996 Elsevier Science.

Liu, et al.; "Defficient DCT-Domain Blind Measurement and Reduction of Blocking Artifacts"; pp. 1139-1149; IEEE Transaction on Circuits and Systems for Video Technology; Dec. 2002.

Fan, et al.; "Identification of Bitmap Compression History; JPEG Detection and Quantizer Estimation"; pp. 230-235; IEEE Transactions on Image Processing; Feb. 2003.

Yu, et al.; "A Triage Metric for Determining the Extent of DCT-Based Compression Aritifacts in a Digital Image"; pp. 443-452; Journal of Imaging Science and Technology; Oct. 2002.

Katajamaki, et al.; "Objective Quality of Potential Measures of Natural Color Images"; pp. 250-263; Journal of Imaging Science and Technology; May/Jun. 1998.

Nill, et al.; "Objective Image Quality Measure Derived From Digital Image Power Spectra"; pp. 813-825; Optical Engineering, Apr. 1992.

Chan, et al.; "Modeling and Validation of a Psychovisually Based Image Quality Evaluator for DCT-Based Compression"; pp. 485-495; Signal Processing Image Communication; 2002 Elsevier Science.

* cited by examiner

SYSTEM AND METHOD FOR ESTIMATING IMAGE SHARPNESS

TECHNICAL FIELD

Embodiments of the present invention relate to the fields of image analysis and image processing.

BACKGROUND ART

Image analysis is a process by which an imaging application determines a qualitative or quantitative feature based on input image data. For example, image analysis may be used determine whether an image is in or out of focus, if it is too bright or too dark, or how much sharpening should be applied to it. Image analysis may be implemented in conjunction with an image acquisition or image-printing device. In an image acquisition device it might be implemented for focus determination and visualization applications. In an image-printing device it might be implemented in the context of an image processing system.

Image processing is a process by which an imaging application alters input image data. For example, image processing may be used to change the color space of a digital image. Image processing may be implemented in conjunction with a printing device in order to adjust the color appearance or perceived sharpness of an image according to the specifications of the printing device. Current imaging applications receive image data from a wide array of diverse sources. For example, the image data may be a disposable camera image developed in an automatic film developing treatment machine, scanned at home, and compressed, or may be a manually enhanced high-resolution image from a professional digital image archive. A printer or any other imaging device is typically unable to operate in diverse conditions without first estimating the quality of its input images in order to process them accordingly.

Adaptive image processing is typically used to address problems associated with enhancing images having variable image quality (IQ). Currently, there are several methods of adaptive image processing with respect to image sharpness enhancement. However, the current available methods each present certain operational drawbacks or limitations.

Feature-based models are one category of current adaptive image sharpening methods. Feature-based models require the existence of identifiable features of the image. As such, feature-based models are only useful in situations where certain information is known about an image, and are not generally applicable to all images.

Model-based zero analysis methods are another category of adaptive image sharpening. However, model-based zero analysis assumes a particular parametric blur model and no image noise. Since a blur model for an image is often not known, this class of adaptive image sharpening is only useful in limited situations.

Autoregressive-moving average (ARMA) filter models can also be used for adaptive image sharpening. However, ARMA filter models are computationally intensive, requiring a substantial contribution of computing resources, and are occasionally unstable, thereby providing limited applicability. Similarly, single stage algorithms may be used for adaptive image processing, but are also computationally intensive.

Other current methods for adaptive image enhancement are problematic because they mix sharpness enhancement with contrast enhancement. Because an image can be sharp but have low contrast, or can be blurred but have a high contrast, it may be necessary to differentiate between sharpness and contrast problems, which these methods do no provide. Furthermore, other adaptive image enhancement methods assume a fractal image model, which is not true in the general case.

SUMMARY OF THE INVENTION

Various embodiments of the present invention, a method and system for determining image sharpness estimation of an image, are described herein. In one embodiment, image data for at least one column of pixels and at least one row of pixels of the image is sampled. A first filter is applied on sequential differences of sampled image data resulting in a first filtered sequence of first filtered values. A second filter is applied on the sequential differences resulting in a second filtered sequence of second filtered values. A feature set of pixels of the image is selected. Image sharpness estimation is determined based on the first filtered values and the second filtered values of the feature set of pixels.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should be understood as not being drawn to scale except if specifically noted.

BEST MODE FOR CARRYING OUT THE INVENTION

Reference will now be made in detail to various embodiments of the invention. While the invention will be described in conjunction with these embodiments, it will be understood that they are not intended to limit the invention to these embodiments. On the contrary, the invention is intended to cover alternatives, modifications and equivalents as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
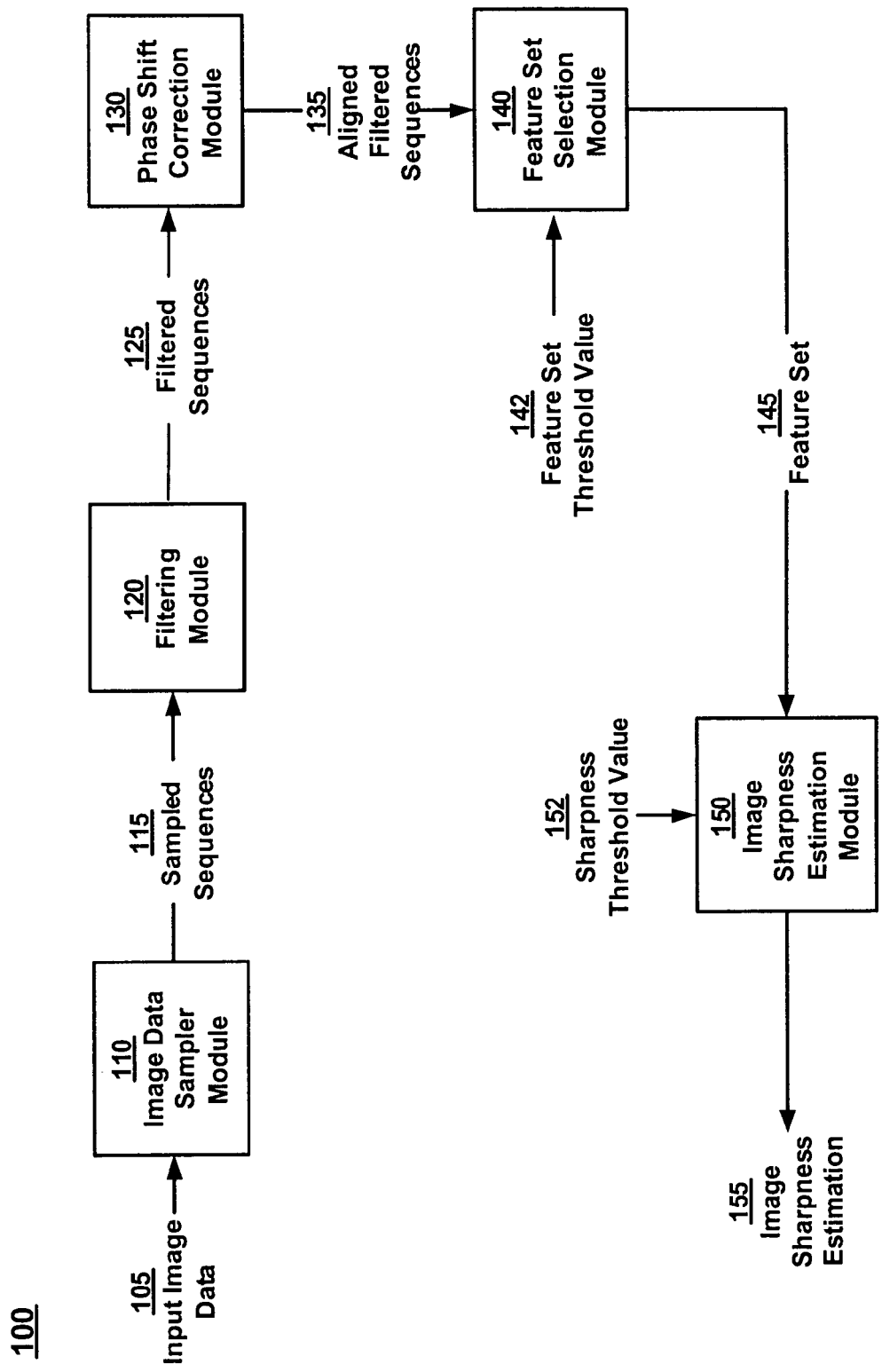
FIG. 1 is a block diagram of system for determining the sharpness of an image, in accordance with an embodiment of the present invention.

FIG. 1 is a block diagram of system 100 for determining the sharpness of an image, in accordance with an embodiment of the present invention. System 100 utilizes sampled data of an image to determine an estimation of image sharpness. System 100 comprises image data sampler module 110, filtering module 120, phase shift correction module 130, feature set selection module 140, and image sharpness estimation module 150. It should be appreciated that system 100 may be implemented within a computer system as software or as hardware. For example, a module may be a piece of software code, a hardware device, or a portion of a hardware device.

System 100 receives input image data 105 at image data sampler module 110. In one embodiment, input image data 105 is a Joint Photographic Experts Group (JPEG) image. It should be appreciated that any form of image data, such as Tagged Image File Format (TIFF), Graphics Interchange Format (GIF), a bitmap, and other form may be used. Input image data 105 includes luminance information and color information. It should be appreciated that image data 105 may also include other image information. In one embodiment, the color information includes Red-Green-Blue (RGB) color scheme data. In another embodiment, the color information includes Cyan-Magenta-Yellow-Black (CMYK) color scheme data. Input image data 105 includes a pixel grid, in which a particular pixel has associated image data. For example, a pixel of the pixel grid includes associated luminance value and color information.

Image data sampler module 110 is configured to sample image data from a portion of pixels of input image data 105. In one embodiment, the sampled image data is a luminance value for a pixel. In another embodiment, the sampled image data is a color value for a pixel. In one embodiment, image data from at least one column of pixels and one row of pixels is sampled. In one embodiment, image data from pixels of every Mth row and every Nth column is sampled, wherein M and N are positive integers. In one embodiment, M and N are equal. The sequences of sampled image data (e.g., sampled sequences 115) are associated with a particular column or row of pixels. Sampled sequences 115 are then forwarded to filtering module 120.

Filtering module 120 is operable to filter sequential differences of sampled sequences 115. It should be appreciated that the sequential differences can be determined at sampler module 110, filtering module 120, or in a separate module. For example, the sequential difference determination may be factored in to individual filters of filtering module 120. In one embodiment, filtering module 120 includes a low pass filter for filtering sampled sequences 115 and a high pass filter for filtering sampled sequences 115. However, it should be appreciated that filtering module 120 may use more or different filters. For example, if an individual filter of filtering module 120 is configured to determine the sequential difference values of sampled sequences 115, the low pass filter may be replaced with a band pass filter. In one embodiment, the filters of filtering module 120 are 6-tap Infinite Impulse Response (IIR) filters. However, it should be appreciated that any filter may be used.

Filtering module 120 applies the filters to sampled sequences 115 to generate filtered sequences 125. For example, where filtering module 120 includes two filters, at least one first filtered sequence of first filtered values associated with a first filter and at least one second filtered sequence of second filtered values associated with a second filter are generated. In one embodiment, where filtering module 120 includes a low pass filter and a high pass filter, at least one low pass sequence of low pass values and at least one high pass sequence of high pass values, respectively, are generated.

In one embodiment, a phase shift between filtered sequences 125 occurs as a result of the filtering. In one embodiment, filtered sequences 125 are transmitted to phase shift correction module 130 in order to compensate for the phase shift. Phase shift correction module 130 is operable to align filtered sequences 125, resulting in aligned filtered sequences 135. Aligned filtered sequences 135 are then transmitted to feature set selection module 140. It should be appreciated that, in various embodiments, no phase shift occurs between filtered sequences 125. In these embodiments, filtered sequences 125 are already aligned, thus obviating the need for phase shift correction module 130. Therefore, phase shift correction module 130 is optional.

Feature set selection module 140 is operable to select a feature set of pixels of the image. In one embodiment, feature set 145 is selected from pixels corresponding to a portion of aligned filtered sequences 135. In one embodiment, feature set selection module 140 receives a feature set threshold value 142. It should be appreciated that feature set threshold value 142 may be automatically generated or user-defined. Feature set selection module 140 compares feature set threshold value 142 to the filtered values of one of aligned filtered sequences 135. If the filtered value is greater than feature set threshold value 142, the corresponding pixel is selected as a pixel of feature set 145. It should be appreciated that a value based on the filtered value may be compared to feature set threshold value 142. For example, filtered value squared may be compared to feature set threshold value 142. Feature set 145 includes the aligned filtered values for the selected pixels. It should be appreciated that a value based on the corresponding values of two or more different aligned filters may be compared to feature set threshold value 142.

Edge pixels are useful in determining image sharpness estimation. As such, it may be desirable to restrict feature set 145 to edge pixels perpendicular to the scanning direction (e.g., a vertical edge pixel in a row sequence or a horizontal edge pixel in a column sequence). In one embodiment, feature set selection module 140 is operable to further constrain feature set 145 by excluding pixels that are not displaced substantially perpendicular to the scanning direction of a sequence. In one embodiment, feature set selection module 140 compares pixels to sampled pixels of neighboring rows in determining whether the pixel is an edge pixel. Feature set 145 is then transmitted to image sharpness estimation module 150.

Image sharpness estimation module 150 is operable to estimate image sharpness 155 based on the aligned filtered values 135 of feature set 145. In one embodiment, the ratio of the second aligned filtered value to the first aligned filtered value 135 for pixels of feature set 145 is calculated. The square function of the ratios are then averaged, resulting in a single value, image sharpness estimation 155. In another embodiment, the ratios are compared to a sharpness threshold value 152 prior to averaging. It should be appreciated that sharpness threshold value 152 may be automatically generated or user-defined. If the square function of the ratio exceeds sharpness threshold value 152, it is replaced with sharpness threshold value 152. In other words, the square function of the ratio is clipped at sharpness threshold value 152. The square function of the ratios and clipped ratios are then averaged, resulting in a single value, image sharpness estimation 155.

It should be appreciated that image sharpness estimation 155 can be calculated in many other ways. For example, in one embodiment, a ratio of the averages of the square function of aligned filtered values is calculated, resulting in image sharpness estimation 155. In another embodiment, weighting factor is used to calculate a ratio of the weighted square function of averages of aligned filtered values, resulting in image sharpness estimation 155. In one embodiment, the image sharpness estimation 155 is used in automatic image sharpness enhancement.

Figure 2:
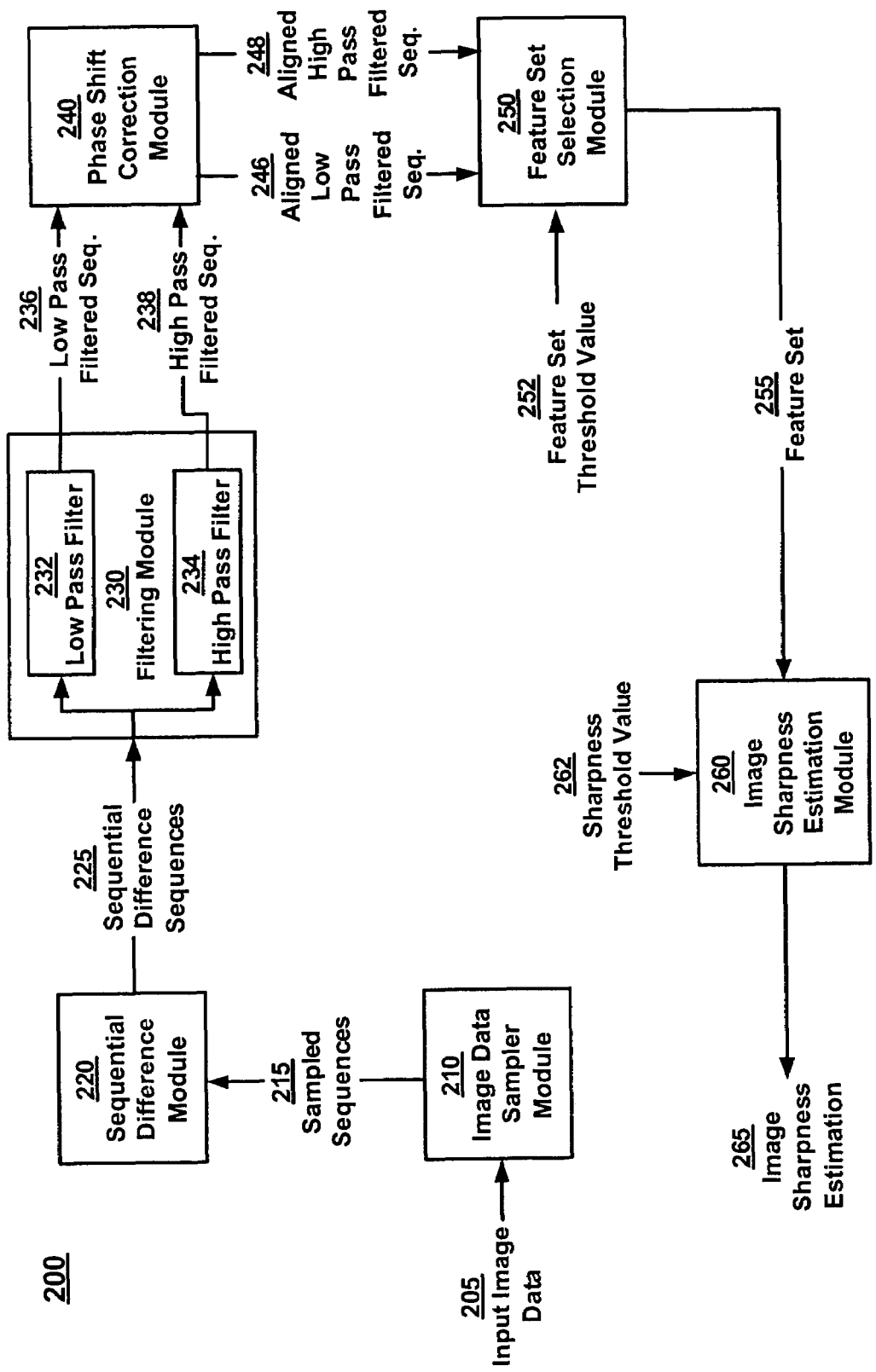
FIG. 2 is a block diagram of another system for determining the sharpness of an image, in accordance with an embodiment of the present invention.

FIG. 2 is a block diagram of system 200 for determining image sharpness estimation of an image, in accordance with an embodiment of the present invention. System 200 is a detailed embodiment of system 100 of FIG. 1, and operates in a similar manner. System 200 utilizes sampled data of an image to estimate image sharpness. System 200 comprises image data sampler module 210, sequential difference module 220, filtering module 230, phase shift correction module 240, feature set selection module 250, and image sharpness estimation module 260. It should be appreciated that system 200 may be implemented within a computer system as software or as hardware. For example, a module may be a piece of software code, a hardware device, or a portion of a hardware device.

System 200 receives input image data 205 at image data sampler module 210. In one embodiment, input image data 205 is a JPEG image. It should be appreciated that any form of image data, such as TIFF, GIF, a bitmap, and other form may be used. Input image data 205 includes luminance information and color information. It should be appreciated that image data 205 may also include other image information. In one embodiment, the color information includes RGB color scheme data. In another embodiment, the color information includes CMYK color scheme data. Input image data 205 includes a pixel grid, in which a particular pixel has associated image data. For example, a pixel of the pixel grid includes associated luminance value and color information.

Image data sampler module 210 is configured to sample image data from a portion of pixels of input image data 205. In one embodiment, the sampled image data is a luminance value for a pixel. In another embodiment, the sampled image data is a color value for a pixel. In one embodiment, image data from at least one column of pixels and one row of pixels is sampled. In one embodiment, image data from pixels of every Mth row and every Nth column is sampled, wherein M and N are positive integers. In one embodiment, M and N are equal. The sequences of sampled image data (e.g., sampled sequences 215) are associated with a particular column or row of pixels. Sampled sequences 215 are then forwarded to sequential difference module 220. A sampled sequence $X_j$ of sampled sequences 215 may be denoted as $X_j$, j=1, 2, 3, 4, ..., N.

Sequential difference module 220 is operable to determine the sequential differences between the sampled values of sampled sequences 215. In one embodiment, a sequential difference $Y_i$ of sequential difference sequences 225 is calculated according to $Y_i = X_{(i+1)} - X_i$, i=1, 2, ... N-1. As described in FIG. 1, it should be appreciated that the sequential differences determination can be combined into filtering module 230.

Filtering module 230 is operable to filter sequential difference sequences 225. In one embodiment, filtering module 230 includes low pass filter 232 and high pass filter 234 for filtering sequential difference sequences 225. However, it should be appreciated that filtering module 230 may use more or different filters. For example, if an individual filter of filtering module 230 is configured to determine the sequential difference values of sampled sequences 215 (e.g., there is no sequential difference module 220), the low pass filter may be replaced with a band pass filter. In one embodiment, low pass filter 232 and high pass filter 234 are 6-tap Infinite Impulse Response (IIR) filters. However, it should be appreciated that any filter may be used. In one embodiment, low pass value $L_i$ is calculated according to Equation 1 and high pass value $H_i$ is calculated according to Equation 2:

$$L_i = a3*Y_{(i-3)} + a2*Y_{(i-2)} + a1*Y_{(i-1)} + a0*Y_i - [b3*L_{(i-3)} + b2*L_{(i-2)} + b1*L_{(i-1)}] \quad (1)$$

wherein a3, a2, a1, a0, b3, b2 and b1 are design parameters of a 6-tap IIR filter. In one embodiment, a3=a0=0.0029, a1=a2=0.0087, b3=−0.5321, b2=1.9294, and b1=−2.3741.

$$H_i = c3*Y_{(i-3)} + c2*Y_{(i-2)} + c1*Y_{(i-1)} + c0*Y_i - [d3*H_{(i-3)} + d2*H_{(i-2)} + d1*H_{(i-1)}] \quad (2)$$

wherein c3, c2, c1, c0, d3, d2 and d1 are design parameters of a 6-tap IIR filter. In one embodiment, c3=0.0317, c2=−0.0951, c1=0.0951, c0=−0.0317, d3=1.4590, d2=0.9104, and d1=0.1978.

Filtering module 230 is operable to generate low pass filtered sequence 236 including low pass values (e.g., $L_i$) and high pass filtered sequence 238 including high pass values (e.g., $H_i$).

In one embodiment, a phase shift between low pass filtered sequence 236 and high pass filtered sequence 238 occurs as a result of the filtering. In one embodiment, low pass filtered sequence 236 and high pass filtered sequence 238 are transmitted to phase shift correction module 240 in order to compensate for the phase shift. Phase shift correction module 240 is operable to align low pass filtered sequence 236 and high pass filtered sequence 238, resulting in aligned low pass filtered sequence 246 and aligned high pass filtered sequence 248. In one embodiment, low pass value $L_i$ is aligned according to $L_i = L(I+dl)$ and high pass value $H_i$ is aligned according to $H_i = H(I+dh)$. In one embodiment, dl=3 and dh=0.

The aligned filtered sequences are then transmitted to feature set selection module 250. It should be appreciated that, in various embodiments, no phase shift occurs between low pass filtered sequence 236 and high pass filtered sequence 238. In these embodiments, low pass filtered sequence 236 and high pass filtered sequence 238 are already aligned, thus obviating the need for phase shift correction module 240. Therefore, phase shift correction module 240 is optional.

Feature set selection module 250 is operable to select a feature set of pixels of the image. In one embodiment, feature set 250 is selected from pixels corresponding to a portion of aligned low pass filtered sequence 246 and aligned high pass filtered sequence 248. In one embodiment, feature set selection module 250 receives a feature set threshold value 252. It should be appreciated that feature set threshold value 252 may be automatically generated or user-defined. Feature set selection module 250 compares feature set threshold value 252 to the filtered values of one of aligned low pass filtered sequence 246 and aligned high pass filtered sequence 248. If the filtered value is greater than feature set threshold value 252, the corresponding pixel is selected as a pixel of feature set 255. It should be appreciated that a value based on the filtered value may be compared to feature set threshold value 252. It should be appreciated that a value based on the corresponding values of two or more different aligned filters may be compared to feature set threshold value 252. For example, filtered value squared may be compared to feature set threshold value 252. Feature set 255 includes the aligned filtered values for the selected pixels. In one embodiment, a pixel $X_t$ is a feature of feature set 252 if $(L_t)^2 > T$, wherein $L_t$ is a low pass value and T is a feature set threshold value. In one embodiment, T=200.

Edge pixels are useful in determining image sharpness estimation. As such, it may be desirable to restrict feature set 255 to edge pixels perpendicular to the scanning direction (e.g., a vertical edge pixel in a row sequence or a horizontal edge pixel in a column sequence). In one embodiment, feature set selection module 250 is operable to further constrain feature set 255 by excluding pixels that are not displaced substantially perpendicular to the scanning direction of a sequence. In other words, feature pixels can be further constrained to have a gradient aligned to the 1D direction. In one embodiment, alignment gradient $Grad_{Align}$ is defined as $Grad_{Align} = X_{(i+1)} - X_{(i-1)}$ and perpendicular gradient $Grad_{Perp}$ is defined as $Grad_{Perp} = X^{+1}_i - X^{-1}_i$, where $X^d_i$ is a pixel displaced d places perpendicular to the row or column. A pixel is excluded from feature set 252 if $$\frac{Grad_{Align}}{Grad_{Perp}}$$

is greater than $T_d$. In one embodiment, $T_d = 3$. In one embodiment, feature set selection module 250 compares pixels to sampled pixels of neighboring rows in determining whether the pixel is an edge pixel. Feature set 255 is then transmitted to image sharpness estimation module 260.

Image sharpness estimation module 260 is operable to estimate image sharpness estimation 265 based on the aligned filtered values 246 and 248 of feature set 255. In one embodiment, the square function of the ratio of the aligned high pass value 248 to the aligned low pass value 246 for pixels of feature set 255 is calculated. The squares of the ratios are then averaged, resulting in a single value, image sharpness estimation 265. In another embodiment, the squares of the ratios are compared to a sharpness threshold value 262 prior to averaging. It should be appreciated that sharpness threshold value 262 may be automatically generated or user-defined. If the ratio exceeds sharpness threshold value 262, it is replaced with sharpness threshold value 262. In other words, the ratio is clipped at sharpness threshold value 262. In one embodiment, sharpness threshold value 262 is 2. The squares of the ratios and clipped ratios are then averaged, resulting in a single value, image sharpness estimation 265. In one embodiment, the image sharpness estimation 265 is used in automatic image sharpness enhancement.

It should be appreciated that image sharpness estimation 265 can be calculated in many other ways. For example, in one embodiment, a ratio of the square function of the averages of aligned filtered values is calculated, resulting in image sharpness estimation 265. In another embodiment, weighting factor is used to calculate a ratio of the weighted squared averages of aligned filtered values, resulting in image sharpness estimation 265.

Figure 3:
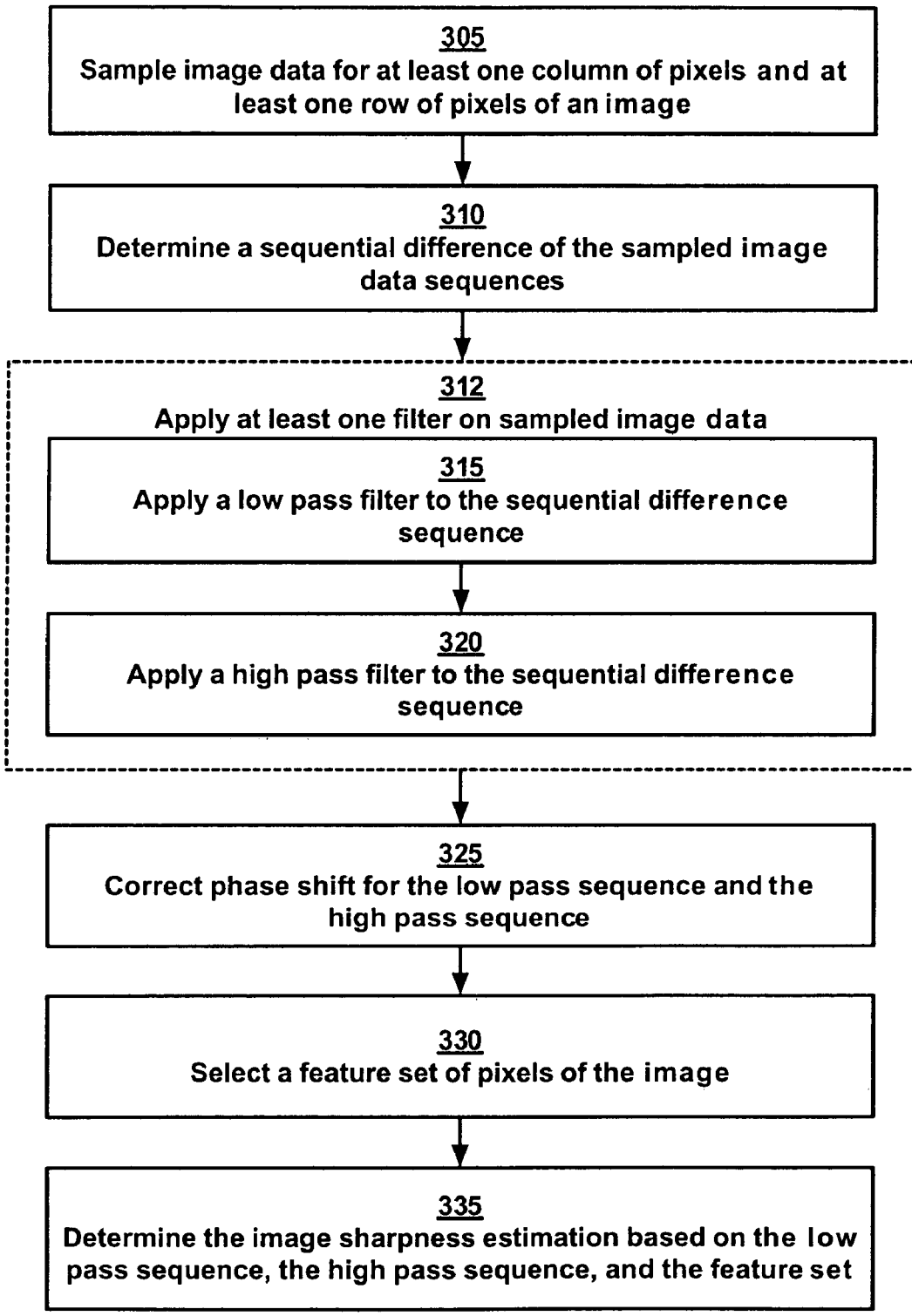
FIG. 3 is a flow chart of a process for determining the sharpness of an image, in accordance with an embodiment of the present invention.

FIG. 3 is a flow chart of a process 300 for determining image sharpness estimation of an image, in accordance with an embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 300, such steps are exemplary. That is, the embodiments of the present invention are well suited to performing various other steps or variations of the steps recited in FIG. 3.

At step 305 of process 300, image data for at least one column of pixels or at least one row of pixels of an image is sampled, resulting in at least one sequence of image data. In one embodiment, the sampled image data includes luminance values. In another embodiment, the sampled image data includes color values. At step 310, a sequential difference of the sampled image data for pixels of the sequence of image data is determined, resulting in a sequential difference sequence. It should be appreciated that step 310 is optional.

At step 312, at least one filter is applied on the sampled image data, resulting in at least one sequence of filtered values. In one embodiment, the filter is operable to directly determine the sequential differences of the sampled image data. In one embodiment, the filter is a band pass filter. In another embodiment, where a sequential difference sequence is determined at step 310, a low pass filter and a high pass filter are applied to the sequential difference sequence. At step 315, a low pass filter is applied to the sequential difference sequence, resulting in a low pass sequence of low pass values. At step 320, a high pass filter is applied to the sequential difference sequence, resulting in a high pass sequence of high pass values. In one embodiment, the low pass filter and the high pass filter are 6-tap IIR filters.

At step 325, phase shift for the low pass sequence and the high pass sequence is corrected. It should be appreciated that the low pass sequence and the high pass sequence may already be aligned; thus, step 325 is optional.

At step 330, a feature set of pixels of the image is selected. In one embodiment, pixels of the feature set are selected from the sampled image data if the low pass value for a pixel exceeds a threshold value. In one embodiment, a pixel is excluded from the feature set if the gradient in the pixel is not substantially perpendicular to the linear direction of image data.

At step 335, the image sharpness estimation is determined based on the low pass values and the high pass values of the feature set of pixels. In one embodiment, the image sharpness estimation is calculated as the average of the square function of ratios of high pass values to corresponding low pass values for pixels of the feature set. In another embodiment, the image sharpness estimation is calculated as the average of the clipped square ratios of high pass values to low pass values for pixels of the feature set. In another embodiment, the image sharpness estimation is calculated as the ratio of the average of square function of high pass values to the average of square function of low pass values for pixels of the feature set. In another embodiment, the image sharpness estimation is calculated as the ratio of the weighted average of square high pass values to the weighted average of square low pass values for pixels of the feature set. In one embodiment, the image sharpness estimation is used in automatic image sharpness enhancement.

Embodiments of the present invention provide a method for determining image sharpness estimation of an image. Specifically, embodiments of the present invention provide for a generally applicable method for determining an estimation of image sharpness. The described embodiments do not require certain information to be known about the image. Furthermore, by sparsely sampling the image data, the described embodiments do not require substantial computations. Moreover, the described embodiments can determine an image sharpness estimation independent of other image features, such as contrast.

Various embodiments of the present invention, a method for determining image sharpness estimation of an image, are thus described. While the present invention has been described in particular embodiments, it should be appreciated that the present invention should not be construed as limited by such embodiments, but rather construed according to the following claims.

What is claimed is:

1. A method for estimating image sharpness, said method comprising:
    sampling image data for at least one of a column and a row of pixels of said image;
    applying a first filter on sequential differences of sampled image data resulting in a sequence of first filtered values;
    applying at least a second filter on said sequential differences resulting in a sequence of second filtered values;
    selecting a feature set of pixels of said image; and
    determining said image sharpness estimation based on said first filtered values and said second filtered values of said feature set of pixels.

2. The method as recited in claim 1 wherein said image data comprises luminance values.

3. The method as recited in claim 1 wherein said first filter is a band pass filter and said second filter is a high pass filter.

4. The method as recited in claim 1 further comprising correcting phase shift for said sequence of first filtered values and said sequence of second filtered values.

5. The method as recited in claim 1 wherein said selecting said feature set of pixels comprises selecting pixels of said image wherein said first filtered value for a pixel exceeds a threshold value.

6. The method as recited in claim 5 further comprising excluding a pixel from said feature set provided a gradient of said pixel is not substantially perpendicular to a linear direction of said sequence of image data.

7. The method as recited in claim 1 wherein said determining said image sharpness estimation comprises:
    calculating ratios of said second filtered value to said first filtered value for pixels of said feature set; and
    averaging a function of said ratios.

8. The method as recited in claim 1 wherein said determining said image sharpness estimation comprises:
    calculating ratios of said second filtered value to said first filtered value for pixels of said feature set; and
    averaging a squared function of said ratios.

9. The method as recited in claim 1 wherein said determining said image sharpness estimation comprises:
    calculating ratios of said second filtered value to said first filtered value for pixels of said feature set;
    provided an absolute value of ratio exceeds a second threshold value, replacing absolute value of said ratio with said second threshold value; and
    averaging a function of said ratios.

10. The method as recited in claim 1 further comprising determining said sequential differences of said sampled image data.

11. A computer-readable medium having computer-readable program code embodied therein for causing a computer system to perform a method for estimating image sharpness, said method comprising:
    sampling image data for at least one of a column and a row of pixels of said image resulting in at least one sequence of image data;
    determining a sequential difference of said image data for pixels of said sequence of image data resulting in a sequential difference sequence;
    applying a low pass filter to said sequential difference sequence resulting in a sequence of low pass values;
    applying a high pass filter to said sequential difference sequence resulting in a sequence of high pass values;
    selecting a feature set of pixels of said image; and
    determining said image sharpness estimation based on said sequence of low pass values and said sequence of high pass values of said feature set of pixels.

12. The computer-readable medium as recited in claim 11 wherein said image data comprises luminance values.

13. The computer-readable medium as recited in claim 11 wherein said low pass filter and said high pass filter are Infinite Impulse Response (IIR) filters.

14. The computer-readable medium as recited in claim 11 wherein said method further comprises correcting phase shift for said sequence of low pass values and said sequence of high pass values.

15. The computer-readable medium as recited in claim 11 wherein said selecting said feature set of pixels comprises selecting pixels of said image wherein said low pass value for a pixel exceeds a threshold value.

16. The computer-readable medium as recited in claim 15 wherein said method further comprises excluding a pixel from said feature set provided a gradient of said pixel is not substantially perpendicular to a linear direction of said sequence of image data.

17. The computer-readable medium as recited in claim 11 wherein said determining said image sharpness estimation comprises:
    calculating ratios of said high pass value to said low pass value for pixels of said feature set; and
    averaging a function of said ratios.

18. The computer-readable medium as recited in claim 11 wherein said determining said image sharpness estimation comprises:
    calculating ratios of said high pass value to said low pass value for pixels of said feature set; and
    averaging a squared function of said ratios.

19. The computer-readable medium as recited in claim 11 wherein said determining said image sharpness estimation comprises:
    calculating ratios of said high pass value to said low pass value for pixels of said feature set;
    provided an absolute value of a ratio exceeds a second threshold value, replacing said ratio with said second threshold value; and
    averaging a function of said ratios.

20. The computer-readable medium as recited in claim 11 wherein said determining said image sharpness estimation comprises calculating a ratio of a sum of said high pass values for pixels of said feature set to a sum of said low pass values for pixels of said feature set.

21. A system for determining an image sharpness estimation of an image, said system comprising:

means for sampling image data for at least one of a column and a row of pixels of said image resulting in at least one sequence of image data;

means for determining a sequential difference of said image data for pixels of said sequence of image data resulting in a sequential difference sequence;

low pass filtering means for applying a low pass filter to said sequential difference sequence resulting in a sequence of low pass values;

high pass filtering means for applying a high pass filter to said sequential difference sequence resulting in a sequence of high pass values;

means for selecting a feature set of pixels of said image; and means for determining said image sharpness estimation based on said sequence of low pass values and said sequence of high pass values of said feature set of pixels.

22. The system as recited in claim 21 further comprising means for correcting phase shift for said sequence of low pass values and said sequence of high pass values.

* * * * *